Jan. 5, 1943.   H. A. WILBER   2,307,477
AUTOMOBILE WINDOW SCREEN
Filed Sept. 3, 1941   2 Sheets-Sheet 1
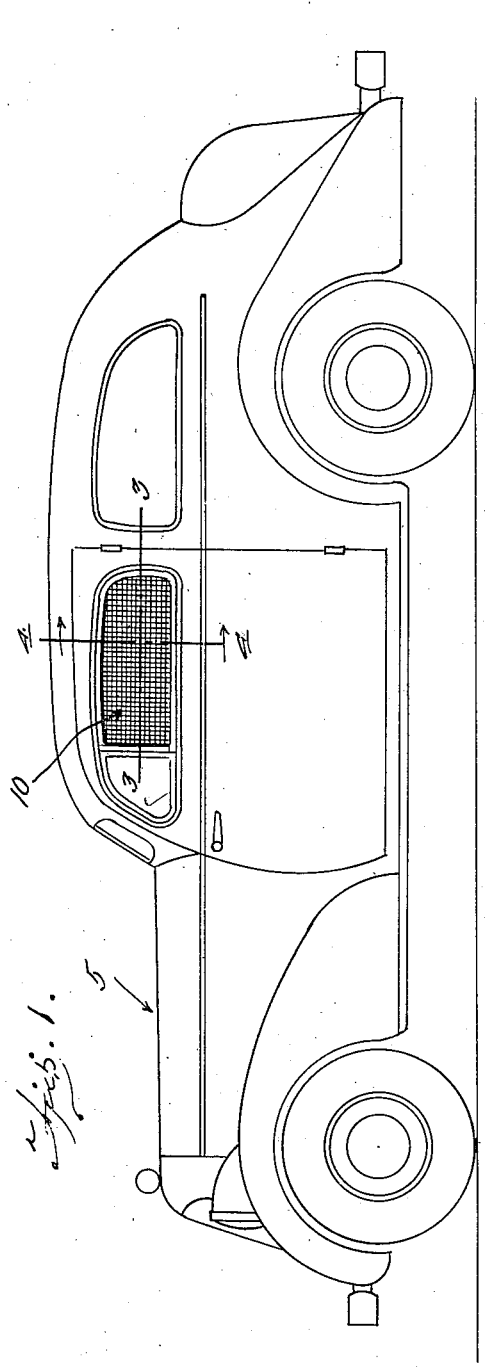
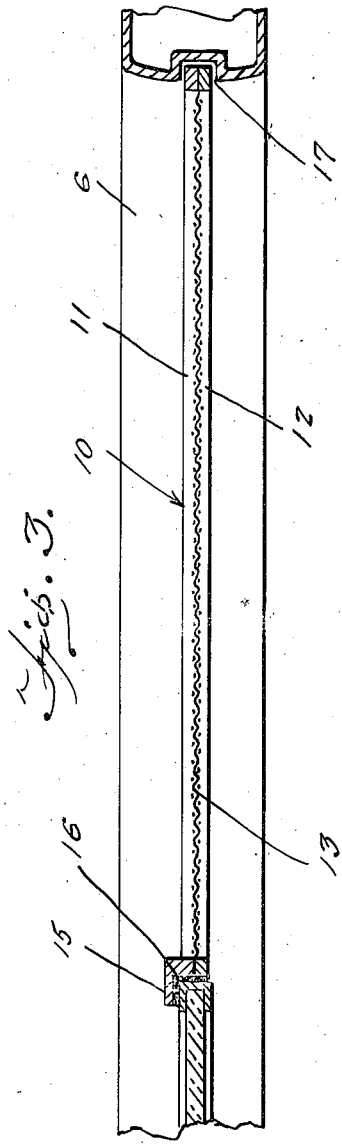
Inventor
Harold A. Wilber
By Clarence A. O'Brien
Attorney

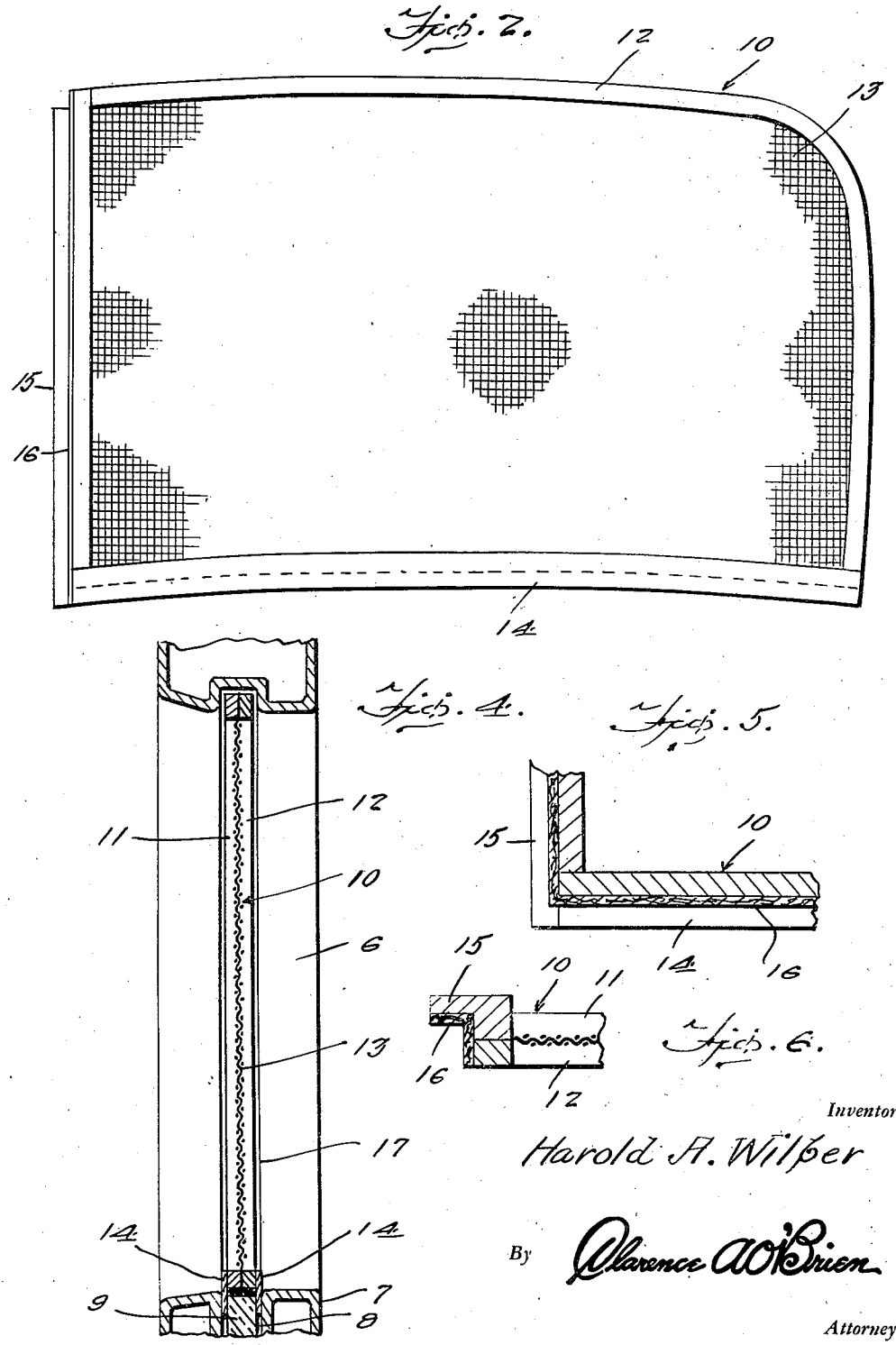

Patented Jan. 5, 1943

2,307,477

UNITED STATES PATENT OFFICE 2,307,477

AUTOMOBILE WINDOW SCREEN

Harold A. Wilber, Decatur, Ill.

Application September 3, 1941, Serial 409,406

1 Claim. (Cl. 160—105)

This invention relates to new and useful improvements in window screens and more particularly to a screen for automobile windows.

The principal object of the present invention is to provide an automobile window screen which can be easily inserted in the usual window opening and retained conveniently in place.

Other objects and advantages of the invention will become apparent to the reader of the following specification.

In the drawings:

Figure 1 represents a side elevational view of an automobile equipped with one of the improved screens.

Figure 2 is a side elevational view of the screen.

Figure 3 is a horizontal sectional view taken substantially on line 3—3 of Figure 1.

Figure 4 is an enlarged vertical sectional view taken substantially on line 4—4 of Figure 1.

Figure 5 is a fragmentary vertical sectional view through one corner portion of the screen.

Figure 6 is a fragmentary horizontal sectional view through one end of the screen.

Referring to the drawings wherein like numerals designate like parts, it can be seen in the drawings that numeral 5 denotes a conventional automobile which for the purpose of illustration has a window opening 6 in one door 7 thereof. This door is of the type having a slot 8 in which a window pane 9 is movable.

Numeral 10 generally refers to the present invention which includes a frame consisting of an inner section 11 and an outer section 12. These sections are secured together against the edge portion of a mesh sheet 13. The frame is shaped to fit the window opening, the lower longitudinal edge portion of which has downwardly disposed flanges 14, 14 spaced to define a channel way to receive the upper edge portion of the window pane 9.

The straight forward edge portion of the frame is constructed with preferably the inner section 11 having a forwardly disposed flange 15 and the inner side of this flange and the adjacent outer edge of the frame is covered by a packing strip 16, this packing strip 16 extending downwardly and across the bottom of the frame between the aforementioned flanges 14, 14.

Obviously by placing the screen structure in the window opening so that the curved edge portion will seat in the vertical guide grooves 17 of the side portions of the window opening 6, the window pane 9 can be slightly raised so as to hold the screen firmly in place.

While the foregoing specification sets forth the invention in specific terms, it is to be understood that numerous changes in the shape, size and materials may be resorted to without departing from the spirit and scope of the invention as claimed hereinafter.

Having described the invention what is claimed as new is:

In combination with an automobile having a window opening and a slidable window pane, a frame for disposition in the window opening and having a mesh filler, and a flange at one end of the frame overlapping at its front edge an edge of the window pane.

HAROLD A. WILBER.